May 14, 1957  J. R. WALSH  2,792,193
LICENSE PLATE BRACKET
Filed July 17, 1956
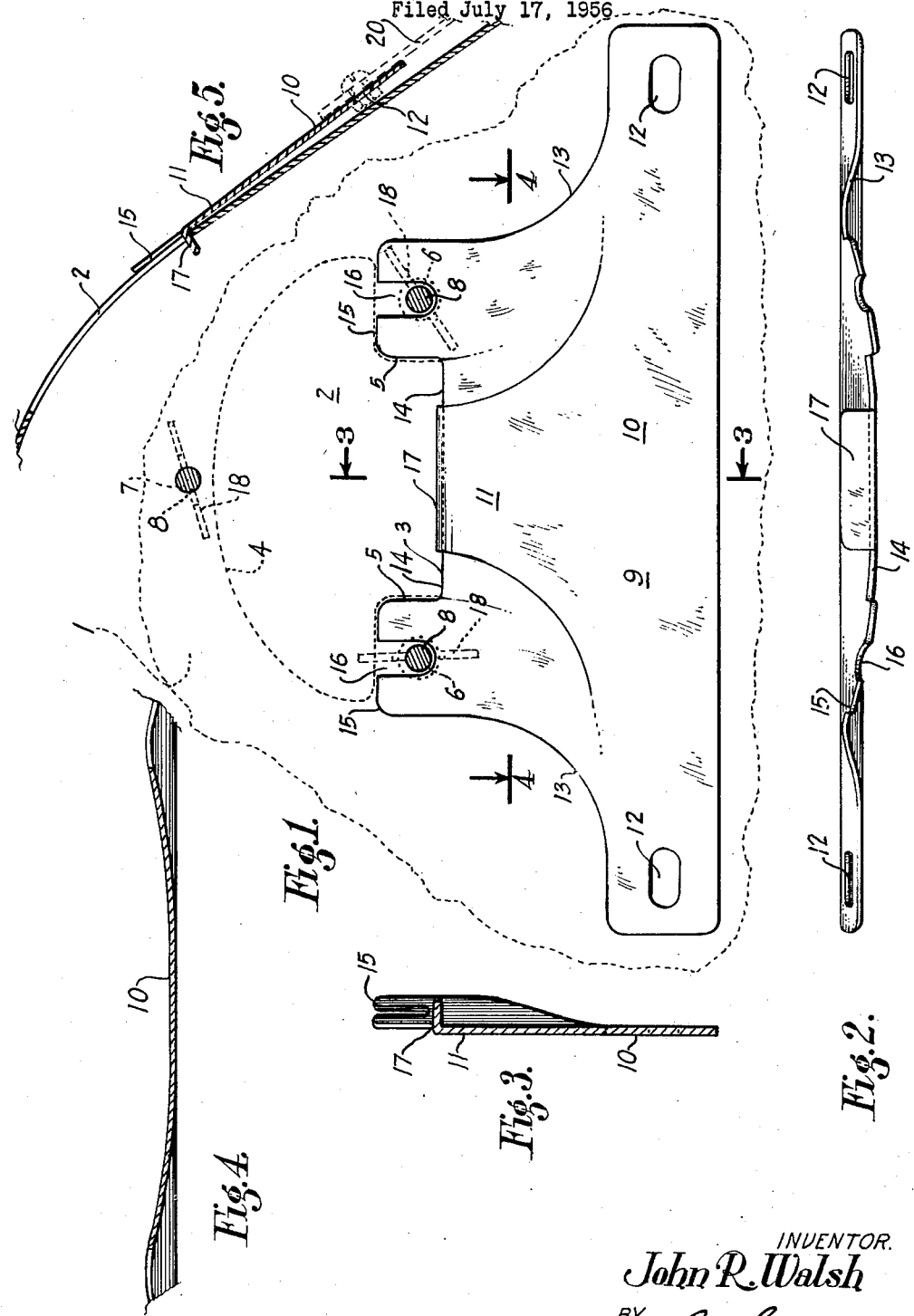
INVENTOR.
John R. Walsh
BY
ATTORNEY

United States Patent Office 2,792,193
Patented May 14, 1957

2,792,193

LICENSE PLATE BRACKET

John R. Walsh, San Bruno, Calif.

Application July 17, 1956, Serial No. 598,275

7 Claims. (Cl. 248—223)

The present invention relates to improvements in a license plate bracket, and has particular reference to a bracket intended to be used for securing a license plate to the rear hood of a Volkswagen, an automobile of German manufacture.

In the Volkswagen, the rear hood has a light housing secured upon a central portion thereof, the hood being contoured transversely to present an artistic outward curve along the median plane thereof.

For securing the lamp housing, the hood is formed with a centrally located aperture defined by a flat bottom edge, a curved upper edge, and oppositely arranged corner pieces at the juncture of the two edges.

The lamp housing is secured upon the hood by means of three screws fixed to the lamp housing and engaging in three holes in the hood, one disposed centrally over the aperture, and the other two in the corner pieces, and each of the screws has a wing nut disposed inside the hood, by means of which the housing may be clamped upon the hood, the two lower screws being used also for clamping a light fixture upon the lower face of the hood, this light fixture being of no immediate interest in the present invention.

The lamp fixture has a dome-shaped upper portion, and a flat, inclined transparent bottom, and is intended to illuminate a license plate arranged below the housing.

The object of the present invention is to provide a license bracket particularly designed for fitting into the above-described structure and for supporting the license plate in proper relation to the lamp housing.

It is further proposed to provide a bracket contoured in its upper portion to fit the contour of the hood, and perfectly straight in its lower portion to fit the license plate.

It is additionally proposed to provide a bracket of the character described which is made of a single sheet of metal and which may be readily stamped out of a plain sheet of material at low cost.

And finally, it is proposed to provide a license plate bracket which may be readily mounted upon the existing structure and firmly anchored thereto, with a minimum of effort.

Further objects and advantages of my invention will appear as the specification proceeds, and the new and useful features of my bracket will be fully defined in the claims attached hereto.

The preferred form of my invention is illustrated in the accompanying drawing, forming part of this application, in which:

Figure 1 illustrates a rear view of my bracket, with the existing structure shown fragmentarily in dotted lines;

Figure 2 shows a top view of my bracket;

Figure 3, a central vertical section through my bracket, as seen from line 3—3 of Figure 1;

Figure 4, a section taken along line 4—4 of Figure 1; and

Figure 5, a central vertical section through the assembly.

While I have shown only the preferred form of my invention, it should be understood that various changes or modifications may be made within the scope of the claims hereto attached, without departing from the spirit of the invention.

Referring to the drawing in detail, Figure 1 shows in dotted lines, a fragmentary portion 1 of the rear hood of a Volkswagen, this portion being taken along the median vertical plane of the hood and intermediate the upper and lower edges thereof.

This portion, used to accommodate a light housing intended to illuminate a suspended license plate, is formed with an aperture 2 defined by a straight bottom edge 3, a rounded upper edge 4 and a pair of rectangular corner pieces 5 joining the bottom and top edges and projecting into the aperture.

The two corner pieces are formed with horizontally alined screw holes 6, and the upper margin of the aperture is formed with a third screw hole 7. The three screw holes are adapted to receive screws 8 projecting from the lamp housing (not shown) for securing the latter upon the margin of the opening. The bottom screws 8 are also used for securing a light fixture (not shown) upon the inside of the hood.

The present invention is directed to the bracket, generally shown at 9.

My invention is in the form of a unitary plate, preferably made of metal, and comprising a lower portion 10 and an upper portion 11.

The lower portion is of a length sufficient to accommodate two holes 12 spaced to correspond to the spacing between the holes conventionally provided along the upper edges of the license plates, so that the latter may be secured by suitable anchoring means engaging in the holes. This lower portion of the bracket is straight to correspond to the shape of the license plate.

The upper portion 11 is somewhat narrower than the lower portion and joins the latter in smooth curves, indicated at 13. It is also formed with a slight transverse curve, as shown in Figure 4, to fit the contour of the hood, which is similarly contoured below the aperture.

The upper edge of the upper portion is formed with a straight central edge 14 and two projecting tongues 15 at the ends thereof, the tongues being formed with inwardly projecting slots 16 spaced to correspond to the spacing between the two screws 8, so that the tongues may be readily slipped over the screws from below in the process of mounting the bracket.

The straight central edge 14 of the bracket is formed with an inwardly projecting flange 17 positioned in such a manner that the flange may be pressed over the corresponding edge 3 of the opening 2 when the slotted tongues 15 are fully engaged over the screws 8 so as to lock the bracket against return movement.

After assembly, the corner pieces 5, the lamp housing and the tongues of the bracket are firmly clamped together by means of wing nuts 18 threaded upon the inner ends of the screws 8.

In installing my bracket, the operator loosens the lamp housing, not shown, by partly unscrewing the wing nuts 18. Next, he urges the tongues 15 upward into the cleared space between the body of the hood and the lamp housing, with the slots 16 engaging the two lower screws 8.

Full engagement of the slots brings the flange 17 immediately over the bottom edge 3 of the aperture 2 so that the flange may now be pushed over the edge by gentle downward pressure which locks the slotted tongues in position.

Now, the operator tightens the wing nuts 18 for clamping the body of the hood, the lamp housing and the interposed tongues 15 into a closely packed unit.

The license plate 20 may then be readily secured upon the lower portion of the bracket by means of bolts using the holes 12.

I claim:

1. A bracket for securing a license plate to a motor vehicle body having an aperture with a horizontal bottom edge and a pair of horizontally spaced screws on opposite sides of said edge to secure a lamp housing over the aperture, the bracket comprising a unitary plate having a pair of spaced and slotted tongues projecting from the upper edge thereof, and adapted for sliding engagement over the screws, the plate having an inwardly projecting flange adapted for engagement over the bottom edge for locking the tongues in position.

2. A bracket for securing a license plate to a motor vehicle body having an aperture with a horizontal bottom edge and a pair of horizontally spaced screws on opposite sides of said edge to secure a lamp housing over the aperture, the bracket comprising, a unitary plate having a pair of spaced and slotted tongues projecting from the upper edge thereof and adapted for sliding engagement over the screws, the plate having an inwardly projecting flange adapted for engagement over the bottom edge for locking the tongues in position, and the plate having a transversely curved upper portion to fit the contour of the body and a straight lower portion adapted to have the license plate secured thereto.

3. A bracket for securing a license plate to a motor vehicle body having an aperture with a horizontal bottom edge and a pair of horizontally spaced screws on opposite sides of said edge to secure a lamp housing over the aperture, the bracket comprising a unitary plate having a pair of spaced and slotted tongues projecting from the upper edge thereof and adapted for sliding engagement over the screws, the plate having an inwardly projecting flange adapted for engagement over the bottom edge for locking the tongues in position, and the plate having a transversely curved upper portion to fit the contour of the body and a straight lower portion adapted to have the license plate secured thereto, with the lower portion projecting beyond the upper laterally in both directions to form extensions having holes therein for receiving attaching bolts.

4. A bracket for securing a license plate to a motor vehicle body having an aperture with a horizontal bottom edge and a pair of horizontally spaced screws on opposite sides of said edge to secure a lamp housing over the aperture, the bracket comprising a unitary plate having a pair of spaced and slotted tongues projecting from the upper edge thereof and adapted for sliding engagement over the screws, the plate having an inwardly projecting flange adapted for engagement over the bottom edge for locking the tongues in position, and the plate having a transversely curved upper portion to fit the contour of the body and a straight lower portion adapted to have the license plate secured thereto, with the lower portion projecting beyond the upper portion laterally in both directions to form extensions having holes therein for receiving attaching bolts, and with the two portions merging into one another along smooth lines.

5. A bracket of the character described, comprising a unitary plate having a straight lower portion and a transversely curved upper portion, the upper portion having a pair of spaced slotted tongues projecting from the upper edge thereof, with a recess formed between the tongues and a flange extending inwardly from the upper edge of the recess.

6. A bracket of the character described, comprising a unitary plate having a straight lower portion and a transversely curved upper portion, the upper portion having a pair of spaced slotted tongues projecting from the upper edge thereof, with a recess formed between the tongues and a flange extending inwardly from the upper edge of the recess, and the lower portion being longer than the upper portion to provide laterally projecting extensions with holes therein to serve as anchorage means for attaching bolts.

7. A bracket of the character described, comprising a unitary plate having a straight lower portion and a transversely curved upper portion, the upper portion having a pair of spaced, slotted tongues projecting from the upper edge thereof, with a recess formed between the tongues and a flange extending inwardly from the upper edge of the recess, and the lower portion being longer than the upper portion to provide laterally projecting extensions with holes therein to serve as anchoring means for attaching bolts, and the portions being made to merge into each other along smooth lines.

No references cited.